US011686434B1

(12) United States Patent
Li et al.

(10) Patent No.: US 11,686,434 B1
(45) Date of Patent: Jun. 27, 2023

(54) SUBMERGED MULTI-MODE CRYOPUMP FOR REFUELING HYDROGEN, SYSTEM HAVING THE SAME, AND METHOD OF USING THE SAME

(71) Applicants: China Energy Investment Corporation Limited, Beijing (CN); National Institute of Clean-and-Low-Carbon Energy, Beijing (CN)

(72) Inventors: Xianming Li, Orefield, PA (US); Anthony Ku, Fremont, CA (US); Edward Youn, Pacific Grove, CA (US); Ashwin Ramteke, San Jose, CA (US)

(73) Assignees: China Energy Investment Corporation Limited, Beijing (CN); National Institute of Clean-and-Low-Carbon Energy, Beijing (CN)

( * ) Notice: Subject to any disclaimer, the term of this patent is extended or adjusted under 35 U.S.C. 154(b) by 0 days.

(21) Appl. No.: 17/677,394

(22) Filed: Feb. 22, 2022

(51) Int. Cl.
*F17C 5/00* (2006.01)
*F17C 13/02* (2006.01)
(Continued)

(52) U.S. Cl.
CPC .............. *F17C 5/007* (2013.01); *F17C 5/02* (2013.01); *F17C 13/025* (2013.01); *F17C 13/04* (2013.01);
(Continued)

(58) Field of Classification Search
CPC .............................................. F17C 2227/0142
See application file for complete search history.

(56) References Cited

U.S. PATENT DOCUMENTS 3,220,202 A * 11/1965 Gottzmann ........... F04B 53/166
417/901
6,474,078 B2  11/2002 Chalk et al.
(Continued)

FOREIGN PATENT DOCUMENTS

JP          2000337597 A  * 12/2000  ............ F17C 13/025

OTHER PUBLICATIONS

JP 2000337597 A: English Translation (Year: 2000).*
(Continued)

*Primary Examiner* — Timothy P. Kelly
*Assistant Examiner* — Christopher M Afful
(74) *Attorney, Agent, or Firm* — Calfee, Halter & Griswold LLP

(57) ABSTRACT

A system and a method for dispensing a liquefied fuel (e.g., hydrogen) are provided. The system includes a cryotank for storing a liquefied fuel, a pump insertable into the cryotank, and a switching valve. The pump has a piston, an intake port, and an isolation valve configured to supply the liquefied fuel to the intake port. The switching valve is controlled to flow the vapor from the pump and the liquefied fuel contacting a backside of the piston to the intake port of the pump. At least one block valve is also connected with the cryotank and the pump. At least one of the switching valve, the at least one block valve, and the isolation valve can be controlled to operate the system in one of three working modes including a pressure increase mode, a pressure maintaining mode, and a pressure decrease mode.

22 Claims, 7 Drawing Sheets

(51) Int. Cl.
   *F17C 13/04* (2006.01)
   *F17C 5/02* (2006.01)
   *G05D 16/20* (2006.01)

(52) U.S. Cl.
   CPC .. *G05D 16/2013* (2013.01); *F17C 2201/0109* (2013.01); *F17C 2201/035* (2013.01); *F17C 2205/0326* (2013.01); *F17C 2205/0352* (2013.01); *F17C 2221/012* (2013.01); *F17C 2223/0161* (2013.01); *F17C 2227/0135* (2013.01); *F17C 2227/0178* (2013.01); *F17C 2250/043* (2013.01); *F17C 2265/065* (2013.01); *F17C 2270/0184* (2013.01)

(56) References Cited

U.S. PATENT DOCUMENTS

| | | |
|---|---|---|
| 7,410,348 B2 | 8/2008 | Chalk et al. |
| 2020/0240379 A1* | 7/2020 | Kratschmar ........... F02M 37/10 |

OTHER PUBLICATIONS

Cryostar, Cryogenic Reciprocating Pumps for Liquefied Gases, https://cryostar.com/datas-pdf/booklet/en/CRYOGENIC-RECIPROCATING-PUMPS%20FOR-LIQUEFIED-GASES-web.pdf.

Li, et al., Liquid pump-enabled hydrogen refueling system for heavy duty fuel cell vehicles: Pump performance and J2601-compliant fills with precooling, International Journal of Hydrogen Energy, 46 (2021) 22018-22029; ScienceDirect, https://www.sciencedirect.com/science/article/pii/S0360319921013483, Received Feb. 12, 2021, Revised Mar. 10, 2021, Accepted Apr. 8, 2021, Available online Apr. 30, 2021.

Nikkiso Clean Energy & Industrial Gases Group, Reciprocating Pumps SGV, https://www.nikkisoceig.com/product/sgv/.

Petitpas, Boil-off losses along LH2 pathway, Lawrence Livermore National Laboratory, LLNL-TR-750685, https://www.osti.gov/biblio/1466121, Final Version Jul. 2018.

\* cited by examiner

SUBMERGED MULTI-MODE CRYOPUMP FOR REFUELING HYDROGEN, SYSTEM HAVING THE SAME, AND METHOD OF USING THE SAME

PRIORITY CLAIM AND CROSS-REFERENCE

None.

FIELD OF THE INVENTION

The disclosure relates to methods and systems for pumping or dispensing a liquefied fuel generally. More particularly, the disclosed subject matter relates to a system, a pump, and a method for pumping and/or refueling hydrogen.

BACKGROUND

Many motor vehicles are currently powered by internal combustion engines with fossil fuels. Due to limited supply and adverse environmental effects associated with burning petroleum-derived fuels, vehicles are now being developed that are powered by alternative environmentally friendly fuels like hydrogen. Fuel cells can be used to produce electric power for motor vehicles by electrochemically reacting hydrogen fuel with an oxidant such as air. Fueling or refueling hydrogen to fuel cell vehicles (FCV) and other hydrogen-powered vehicles presents different challenges from adding petroleum-based fuels like gasoline into a vehicle.

Hydrogen refueling stations for fuel cell vehicles can store fuel as a liquid before it is dispensed to vehicles as compressed gaseous hydrogen. Liquefied gases or fuels such as liquid hydrogen can be stored in a cryogenic tank, which is thermally insulated from environment. However, heat leak into the tank causes liquefied fuel to vaporize to generate "boil-off" vapor as the liquid absorbs the heat leak from the environment. Pressure inside the tank increases as the vapor continues to build up in it. Excess vapor must be vented through a relief valve to the environment to keep the tank under the pressure limit, causing loss of some liquefied fuel or gas. A system for minimizing the boil-off and/or managing the headspace pressure in the storage tank is needed.

SUMMARY OF THE INVENTION

The present disclosure provides a system and a method for storing and dispensing a liquefied fuel. For example, the liquefied fuel comprises or is hydrogen, and the system is a system for storing and dispensing liquid hydrogen. The system is for refueling hydrogen to fuel-cell based vehicles in some embodiments.

In accordance with some embodiments, such a system comprises a cryotank configured to store a liquefied fuel therein, and a pump is configured to be disposed inside the cryotank (i.e., an intake port is submerged in the liquid fuel in the cryotank) and provide a stream of the liquefied fuel from the cryotank. The pump comprises a piston, an intake port, and an isolation valve configured to supply the liquefied fuel to the intake port.

The system further comprises a first pipe fluidly connected to a vapor pump chamber configured to hold vapor of the liquefied fuel in the pump, and a second pipe fluidly connected to a first liquid pump chamber configured to hold the liquefied fuel contacting a backside of the piston. Such a liquefied fuel from the backside of the piston may absorb dynamic heat when the pump works in an extension or retraction mode, and may be warmer than the liquefied fuel in the intake port from the cryotank. In some embodiments, the vapor pump chamber is an upper pump chamber in the upper section of the pump, and the liquid pump chamber or chambers are lower pump chambers in the lower section of the pump.

In accordance with some embodiments, the system comprises a switching valve, which is fluidly connected to the first pipe and the second pipe, and is configured to flow the vapor of the liquefied fuel in the pump and the liquefied fuel contacting the backside of the piston to the intake port of the pump through a third pipe.

The system further comprises at least one block valve fluidly connected to the first pipe, the second pipe, and a headspace of the cryotank. The at least one block valve is fluidly connected to the switching valve. Each of the switching valve and the at least one block valve can be opened or closed.

The system is configured to be operated in one of three working modes including a "pressure increase" mode, a "pressure maintaining" mode, and a "pressure decrease" mode, to increase, maintain, or decrease a headspace pressure inside the cryotank, respectively.

The system may further comprise a controller connected with the cryotank, the at least one block valve, and the switching valve. The controller is configured to measure the headspace pressure inside the cryotank and control the at least one block valve, the switching valve, and/or the isolation valve so that the system is operated in one of the three working modes based on the headspace pressure.

In some embodiments, in the pressure increase mode, the switching valve is closed and the at least one block valve is open. The isolation valve may be closed or open. In the pressure maintaining mode, the switching valve is open, the at least one block valve is closed, and the isolation valve is open. In the pressure decrease mode, the switching valve is open, the at least one block valve is open, and the isolation valve is closed.

In some embodiments, the liquefied fuel is liquid hydrogen, and the system is a hydrogen refueling system. The system is for refueling hydrogen as a compressed gas into a fuel-cell vehicle.

The system further comprises a discharge line fluidly connected with the pump and configured to dispense the stream of the liquefied fuel out of the pump. Such a stream of the liquefied fuel may be provided to a dispenser, and dispensed into an on-board tank in a fuel-cell vehicle in some embodiments.

In some embodiments, the switching valve is disposed outside the pump. The pump has a pump housing with a double-wall structure. The first pipe, the second pipe, and the third pipe are disposed between two walls of the pump housing.

In some embodiments, the pump comprises more than one, for example, two or more such submerged liquid pumps disposed inside the cryotank. Each pump has a respective intake port or the two or more submerged liquid pumps share a single intake port. The two or more submerged liquid pumps may be connected in parallel to the first pipe, the second pipe, and the third pipe, respectively.

In one aspect, the present invention provides a system for refueling hydrogen. The system comprises a cryotank configured to store a liquefied fuel therein, which is hydrogen, and a pump configured to be disposed inside the cryotank. The pump is configured to provide a stream of the liquefied fuel from the cryotank. The pump has a piston, an intake port, and an isolation valve configured to supply the liquefied fuel to the intake port. The piston has a front side facing the intake port and a backside opposite to the front side.

The system further comprises a first pipe fluidly connected to a vapor pump chamber configured to hold vapor of the liquefied fuel in the pump, and a second pipe fluidly connected to a first liquid pump chamber configured to hold the liquefied fuel contacting a backside of the piston.

The system further comprises a switching valve fluidly connected to the first pipe and the second pipe. The switching valve is configured to flow the vapor of the liquefied fuel in the pump and the liquefied fuel contacting the backside of the piston to the intake port of the pump through a third pipe. The system further comprises at least one block valve fluidly connected to the first pipe, the second pipe, the cryotank, and the switching valve.

The system may also comprise a controller connected with the cryotank, the at least one block valve, and the switching valve. The controller is configured to actuate the at least one block valve, the switching valve, and/or the isolation valve so as to operate the system in one of three working modes based on the headspace pressure in the cryotank. The three working modes include a pressure increase mode, a pressure maintaining mode, and a pressure decrease mode.

The controller may comprise one or more processors and at least one tangible, non-transitory machine readable medium encoded with one or more programs to be executed by the one or more processors to control the components of the system. For example, the controller may be configured to measure the headspace pressure and actuate the at least one block valve, the switching valve, and/or the isolation valve.

In another aspect, the present disclosure provides a method of using the system as described herein. Such a method comprises steps of providing a liquefied fuel stored inside a cryotank, measuring a headspace pressure inside the cryotank, and determining one working mode of the system to be operated based on the headspace pressure. The working mode is one of three working modes including a pressure increase mode, a pressure maintaining mode, and a pressure decrease mode. The method further comprises actuating at least one of the at least one block valve, the switching valve, and the isolation valve so as to operate the system in the working mode.

In some embodiments, when the headspace pressure is lower than a first threshold pressure (P1), the pressure increase mode is determined and activated. When the headspace pressure is in a range from the first threshold pressure (P1) to a second threshold pressure (P2), wherein P2>P1, the pressure maintaining mode is determined and activated. When the headspace pressure is higher than the second threshold pressure (P2), the pressure decrease mode is determined and activated.

In some embodiments, in the pressure increase mode, the switching valve is closed and the at least one block valve is open. The isolation valve may be closed or open. In the pressure maintaining mode, the switching valve is open, the at least one block valve is closed, and the isolation valve is open. In the pressure decrease mode, the switching valve is open, the at least one block valve is open, and the isolation valve is closed.

The method may further comprise pumping a stream of the liquefied fuel from the cryotank and out of the pump to a discharge line. In some embodiments, the liquefied fuel comprises hydrogen, and the method is for refueling hydrogen to a fuel-cell vehicle. The stream of the liquefied fuel is pumped to a dispenser, and is dispensed into an on-board tank of a fuel-cell vehicle.

The system and the method provided in the present disclosure provide many advantages as described herein. For example, in some embodiments, the present disclosure provides a system for hydrogen storage and refueling. The benefits include the ability to work in multiple-mode based on the headspace pressure, manage headspace pressure, and minimize loss of the liquefied fuel. The system minimizes or eliminates losses of liquefied fuel such as hydrogen or has minimal losses of hydrogen boil-off.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION

Figure 1:
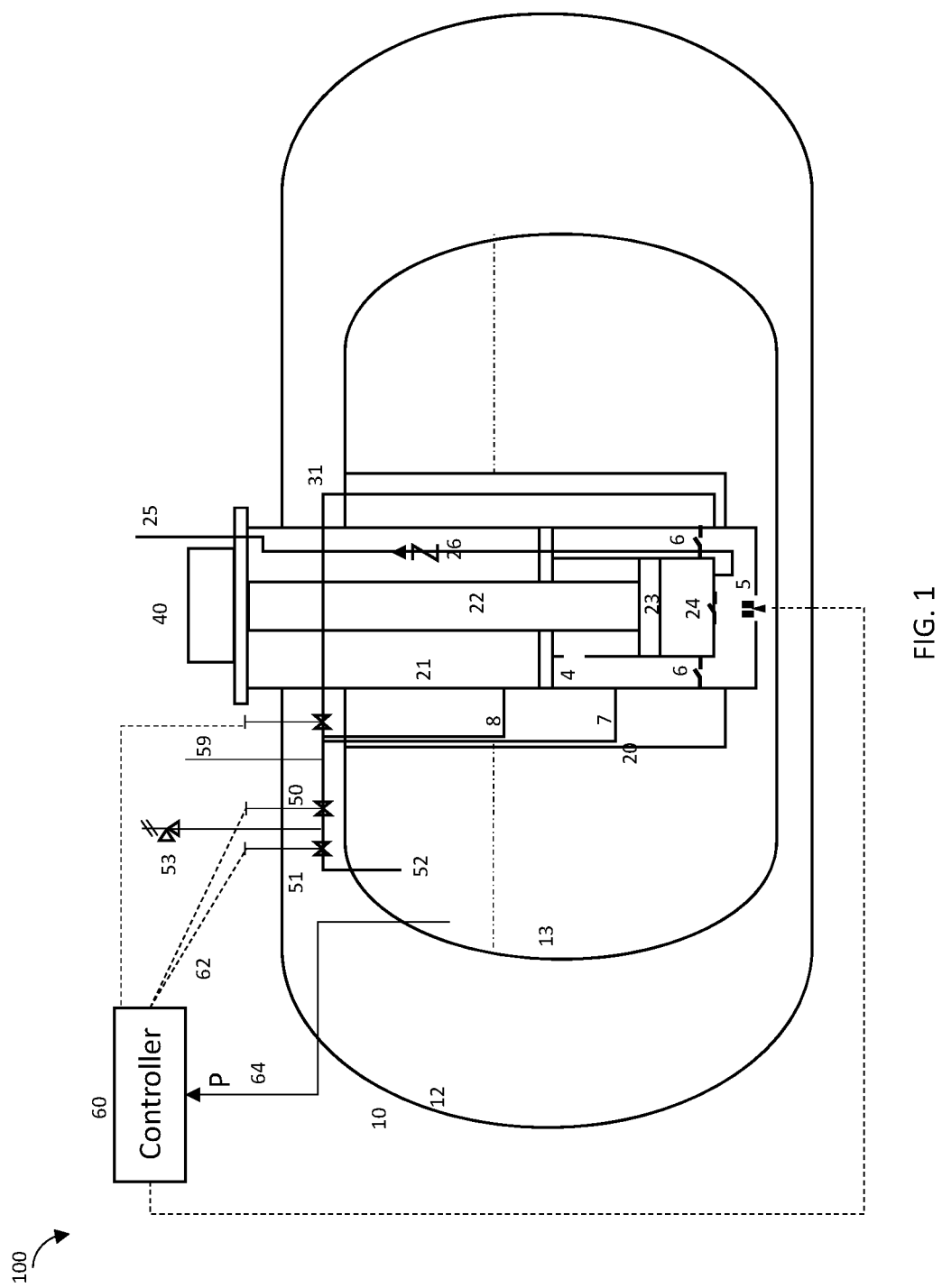
FIG. 1 is a schematic block diagram in a cross-sectional view illustrating an exemplary system comprising a submerged cryopump in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

Unless it is expressly stated otherwise, the term "substantially" such as in "substantially the same" used herein will be understood to encompass a parameter with a fluctuation in a suitable range, for example, with ±10% or ±15% fluctuation of the parameter. In some embodiments, the range of fluctuation is within ±10%.

Unless expressly indicated otherwise, a liquefied fuel such as hydrogen is stored in a storage tank, and pumped out using a pump in liquid form. It can be dispensed as a gaseous fuel or liquid fuel into a receiving tank in a vehicle. In the present disclosure, the terms "fueling" and "refueling" are used interchangeably.

As used herein, when an element or component is described as forming a "connected to," "coupled to," "coupled with" or "in contact with" another element or component, it can be directly connected to, directly coupled with, in direct contact with, or intervening elements or components may be connected, coupled or in contact with the particular element or component. When an element or component is referred to as being "directly connected to," "directly coupled to," "directly coupled with," or "directly in contact with" another element, there are no intervening elements or components.

As used herein, the terms "thermally coupled to" or "thermally coupled with" used herein will be understood that the components are coupled together directly or through an intervening component so that heat can be transferred among the components, and the components may be in direct contacted with each other or the intervening component contact the components. As used herein, the terms "fluidly coupled (or connected) to" or "fluidly coupled (or connected) with" used herein will be understood that the components are connected with pipes or lines and configured to have gas or liquid flow through the components. As used herein, the terms "electronically connected" or "electrically connected" used herein will be understood to encompass electrical connection using wires or wireless connection.

The terms "extension" and/or "extend" used herein will be understood to encompass a working mode of the cryopump, in which the piston including the piston rod is extending, and provides compression in the cryopump. The terms "retraction" and/or "retract" will be understood to encompass a different working mode of the cryopump, in which the piston including the piston rod is moving in suction stroke, which is in the opposite direction of extension. In some embodiments, the piston has a front surface facing an intake port. In the extension mode, the piston moves toward the intake port. In the retraction mode, the piston moves further away from the intake port.

A check valve as described herein is a one-way valve, which opens automatically in one direction only or is closed. An isolation valve as described herein is controllable to be open or closed. When the isolation valve is open, the liquefied fuel from the cryotank is admitted into the cryopump. A switching valve as described herein is controllable to be closed or to be open to flow a fluid in one direction only. A block valve as described herein is controllable to be closed or open so as to block or permit a fluid to move in one or more direction.

The term "ambient temperature" used herein will be understood as a temperature under ambient condition, for example, a room temperature of 20-22° C.

Liquefied gases or fuels such as liquid hydrogen ($LH_2$) are stored in cryogenic tanks. Heat leak into these tanks causes the liquid to vaporize, generating "boil-off" vapor and increasing the pressure of the headspace gas in the tank. Over time, a build-up of pressure in the tank leads to the need to vent gaseous hydrogen in the headspace to keep the cryotank under its pressure limit. As an alternative to venting, the boil-off problem can be solved by introducing cooling duty into the tank to offset the heat leak. A goal for cryogenic liquid hydrogen storage is to minimize boil-off or eliminate losses of hydrogen as gas from the cryotank, resulting in improved operational efficiency.

One challenge associated with the onsite storage of $LH_2$ in cryotanks at hydrogen refueling stations is the boil-off. The resulting increase in gaseous $H_2$ in the cryotank headspace causes the pressure to increase. Over time, the headspace pressure increases; venting is needed as the pressure approaches the maximum rated pressure of the cryotank. Venting results in either a loss of $H_2$ due to unproductive release to the environment, or additional system components in the system to capture and productively utilize the vented $H_2$. The term "headspace pressure" used herein refers to the pressure of the vapor phase of the liquefied fuel in the cryotank. The term "tank pressure" used herein refers to the pressure of the liquid phase of the liquefied fuel in the cryotank. The headspace pressure and the tank pressure are equal to each other, and can be used interchangeably.

Hydrogen refueling stations that store fuel as liquid hydrogen ($LH_2$) in onsite cryotanks must manage the headspace pressure in the cryotank. If the pressure is too low, there is a risk of tank collapse. If the pressure is too high, the tank must vent gaseous hydrogen to avoid tank rupture; in addition, high headspace pressure is also associated with lower density liquid fuel resulting in lower efficiency operation of liquid pumps that deliver the $LH_2$ to downstream refueling components.

The present disclosure provides a system such as a refueling station and a method for managing the headspace pressure because of the boil-off during storage or dispensing of a liquefied fuel. For example, the liquefied fuel comprises or is hydrogen, and the system is a system for storing and/or using liquid hydrogen.

In accordance with some embodiments, a refueling station design provided in the present disclosure allows management of the headspace pressure through use of a submerged pump with a multi-mode operating capability. The pump or the pumping system is for pumping liquid hydrogen. For example, in a first mode, the pumping system can increase the headspace pressure. In a second mode, the pumping system can maintain the headspace pressure. In a third mode, the pumping system can evacuate the headspace vapor directly to reduce headspace pressure. A valve is used to switch between these modes of operation.

A related challenge in $LH_2$ pumping is the need for high quality liquid at the intake to maintain high volumetric efficiency and high mass flow rate. The liquid quality depends on the conditions of the liquefied gas storage tank. To maintain good quality liquid in the storage tank, heat input to the cryogenic vessel must be minimized. Heat input comes in both as static heat leak and dynamic heat leak.

Static heat leak occurs because of conduction and radiation heat transfer through vessel walls, support structures, and piping. In cryogenic storage vessels, a vacuum double wall construction with multi-layer insulation can be used in the evacuated space and low conductivity materials for support structures. However, static heat leak can be minimized, but not eliminated. Industry experience for static heat flux in a liquid hydrogen storage vessel is approximately 1 $W/m^2$ based on inner vessel surface area. For a 18,000 gallon liquid hydrogen storage vessel, this translates to approximately 200 W, or a normal evaporation rate (NER) of less than 1% per day.

Dynamic heat leak is heat input during operation of the pump. It includes mechanical energy used to overcome friction instead of raising the discharge pressure, seal leak or blowby, and thermodynamic non-isentropic behavior. It depends on pump flow rate and intake liquid density and is heavily impacted by pump design such as seals and placement of the pump relative to the cryotank (i.e., external or submerged inside the cryotank). The dynamic heat leak is generally several times more than static heat leak. For example, the required isentropic pumping power is 34.4 kW to pressurize 120 kg/hr flow rate of liquid hydrogen from its normal boiling point to a discharge pressure of 900 bar. Each percent of non-isentropic loss is 340 W which is already more than the typical NER of a large cryogenic storage tank. For external pumps, the initial cooldown is another major source of boil-off loss. During normal operation, the short heat paths in an external pump involving the piston shaft, the vacuum jacketed casing, and the liquid hydrogen bath around the pump cause much more heat leak and dynamic boil-off than a submerged pump. The vapor return through vacuum jacketed piping brings additional heat into the cryotank.

The use of a liquid pump to deliver fuel during refueling operations can either increase or decrease the headspace pressure. During long period of inactivity, static heat leak can cause the cryotank pressure to increase. Pump operation, especially with an inefficient pump design, dynamic heat leak can also cause cryotank pressure to increase. During a cryopump operation, energy is delivered to the tank through dynamic heat leak, but also removed from the cryotank by the discharged fluid. In addition, the removal of $LH_2$ increases the headspace volume in the cryotank leading to a reduction in pressure. Thus, changes in the cryotank pressure depend on the balance between energy outflow and heat leak, and the dynamic heat leak is the key to maintaining low tank pressure and high liquid density.

To maintain high volumetric efficiency of cryopumps, both static and dynamic heat leak into the cryotank must be minimized to maintain low cryotank pressure and high liquid density. However, the headspace pressure cannot be reduced below a given threshold because it risks imploding the cryotank. During high flow pumping such as back-to-back fueling of vehicles, the cryotank pressure can decrease below a desired limit. In such cases, a method of adding energy into the cryotank to build pressure is desired. It is highly desirable to have a system and a method of switching among a pressure building mode, a pressure maintaining mode, and a pressure reduction mode as provided in the present disclosure.

In one aspect, the present disclosure provides a refueling station design that allows management of the headspace pressure through use of a submerged $LH_2$ pump with a multi-mode operating capability. The three modes are a "pressure building" mode, a "pressure maintaining" mode, and a "pressure reducing" mode. In the pressure building mode, the pump operates in a manner that accommodates sufficient boil-off to maintain cryotank pressure during high flow pumping to prevent the tank from collapsing. In the pressure maintaining mode, the pump operates in a manner that removes dynamic heat leak from the cryotank along with the discharged fluid to maintain the headspeace pressure. In the pressure reduction mode, the headspace vapor is removed directly to reduce the headspace pressure. These modes are enabled by separate piping configurations between the liquid pump and the rest of the system. The system can switch between these modes with manual or automatic valves.

In accordance with some embodiments, a switching valve as described herein allows the system to switch among these modes of operation. For example, in "pressure building" mode, dynamic heat leak from the cryopump operation is redirected into the cryotank to increase pressure. The headspace pressure may be also partially increased during the use of the system because of the boil-off vapor of the liquefied fuel in the tank. In "pressure maintaining" mode, the fluid flow out of the cryotank carries the dynamic heat leak. In the "pressure reduction" mode, the headspace vapor is removed to reduce pressure directly. As described above, the largest heat source is dynamic heat leak. By controlling this source of heat, the mode switching method can either add heat to the cryotank to build pressure or direct such heat away from the tank to reduce pressure.

A single system having the multi-mode configuration implement all the functions associated with three modes in a controlled manner. The system offers utility in managing the cryotank pressure. The state of the liquid is adjusted towards thermodynamic equilibrium with the headspace gas. At lower pressures, the liquid quality (as determined by its density) is higher. Higher liquid quality results in more efficient pump operation; an additional benefit is the avoided loss in $H_2$ from the tank during venting episodes associated with overly high pressure. The switching valve as described herein is used to redirect the fluid path wherein the heat content is routed as desired. Pressure building and pressure reduction are often considered to be mutually exclusive features; solutions that solve one of these issues, necessarily exacerbate the converse situation. By rerouting the fluid and the dynamic heat input, cryotank pressure management becomes feasible using the system and the method as described herein.

Field testing recently demonstrated that the submerged pump as described in U.S. Pat. No. 11,149,703 is capable of reducing the headspace pressure in the tank, but this occurred only during extended operation of the pump and there was no indication that active control of the headspace pressure was possible. The system and the method provided in the present disclosure can be used to actively manage the several modes of operation.

The present disclosure also provides a method for refueling hydrogen fuel cell vehicles, wherein the hydrogen fuel is stored onsite as $LH_2$ in a cryotank, and the multi-mode pumping system is used to dispense the fuel. When the headspace pressure is below a first threshold, the pumping system is operated in a first mode which increases the headspace pressure. When the headspace pressure is above the first threshold and below a second threshold, the pumping system is operated in a second mode which maintains the headspace pressure. When the headspace pressure above yet a second threshold, the pumping system is operated to evacuate headspace vapor directly to reduce headspace pressure. A controller is used to monitor the headspace condition and switch between the operating modes.

In FIGS. 1-6, like items are indicated by like reference numerals, and for brevity, descriptions of the structure, provided above with reference to the preceding figures, are not repeated. The method described in FIG. 7 is described with reference to the exemplary structure described in FIGS. 1-6.

Figure 2:
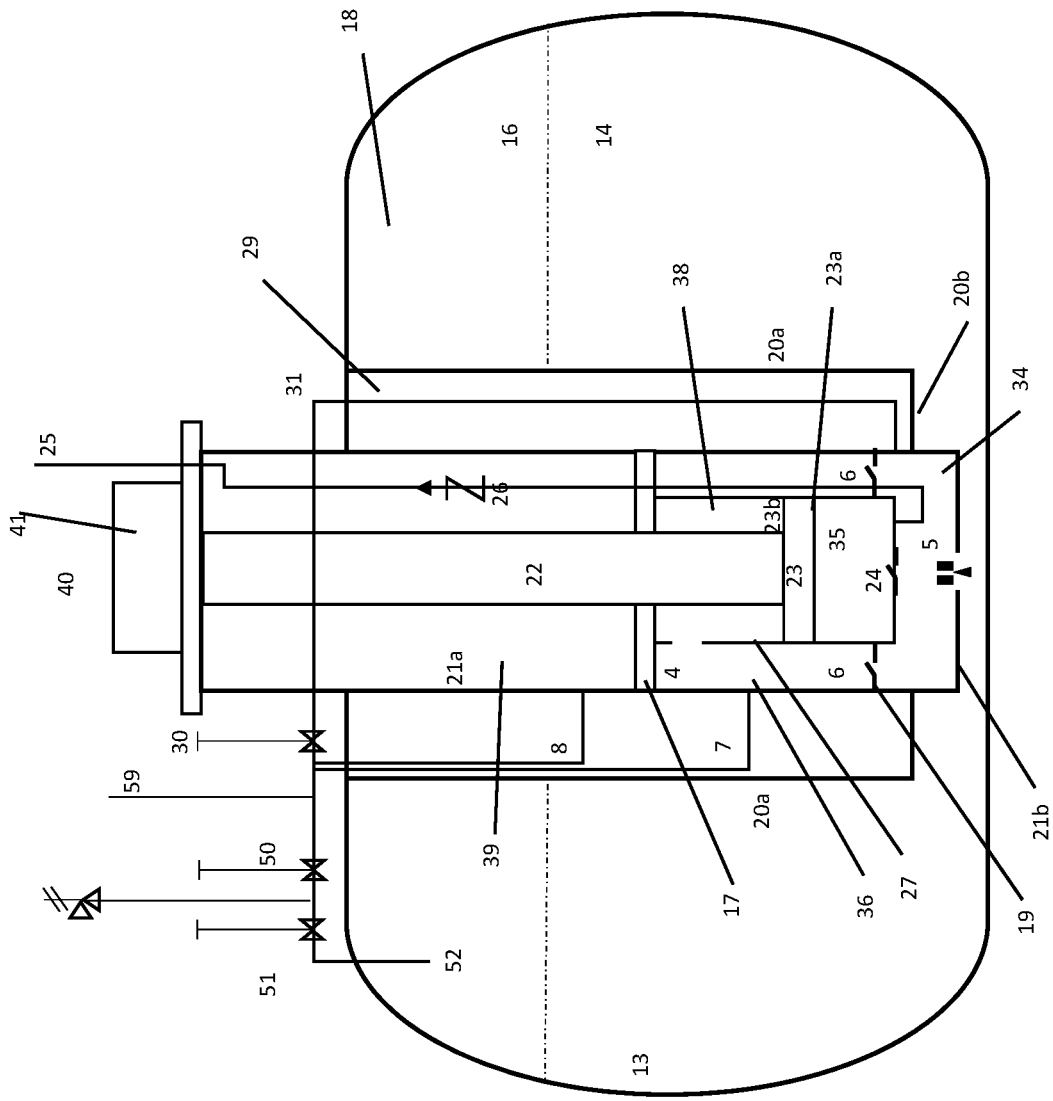
FIG. 2 is a magnified view of a portion of exemplary system of FIG. 1 with additional reference numerals.

Refer to FIGS. 1-2, an exemplary system 100 or called a submerged pumping system in accordance with some embodiments is illustrated. The exemplary system 100 comprises a cryotank 10 and a pump 40.

In some embodiments, the cryotank 10 is a double-wall cryotank with an external vessel 12 (or called external wall) and an internal vessel 13 (or called internal wall). The space between the two walls of vessels 12 and 13 is in vacuum or filled with insulation materials.

The cryotank 10 is configured to store a liquefied fuel 14 therein. The cryotank 10 may be an insulated tank suitable for storing a liquefied fuel 14 such as liquid hydrogen at low temperature and under pressure. In some embodiments, the liquefied fuel 14 comprises or is hydrogen. A vapor phase 16 (boil-off) of the liquefied fuel 14 may exist above the liquid phase of the liquefied fuel 14 in a headspace 18 inside the internal vessel 13 of the cryotank 10.

The pump 40 is configured to be disposed inside the cryotank 10 and provide a stream of the liquefied fuel from the cryotank 10. The pump 40 is a submergible pump, wherein the pump intake port is submerged inside the liquefied fuel 14 in the cryotank 10 during use. The pump 40 is inserted into the cryotank 10, and can be taken out for maintenance. The pump 40 has a pump housing including an outer pipe (or tube) 20. The pump 40 may also include an inner pipe (or tube) 21. The outer pipe 20 itself or the combination of the outer pipe 20 and the inner pipe 21 as a double-wall structure can be referred as the pump housing. The outer pipe 20 and inner pipe 21 can be referred as the first and the second pipes or tubes, and have a first diameter and a second diameter, which is larger than the first diameter. The inner pipe 21 is connected to the external vessel 12 of the cryotank 10. The outer pipe 20 is connected to the inner vessel 13 of the cryotank 10. As shown in FIG. 2, the outer pipe 20 has a side wall 20a and a bottom wall 20b. The inner pipe 21 has a side wall 21a and a bottom wall 21b. A space 29 between the side wall 21a of the inner pipe 21 and the side wall 20a of the outer pipe 20 exists. Such a space 29 may be in vacuum or filled with insulation, and accommodates other pipes such as pipes 7, 8, and 31 as described herein. The pump 40 is configured to be disposed inside the cryotank 10. In other words, the pump 40 is insertable or is inserted into the cryotank 10. In some embodiments, the crypopump 40 except the pump housing including the outer pipe 21 or the outer pipe 21 and the inner pipe can be taken out for maintenance.

In some embodiments, the pump 40 is a single-stage, single-acting reciprocating cryopump. In some embodiments, the pump 40 includes a separator 17 disposed inside the inner pipe 21 and coupled to the side wall 21a and divides the space within the inner pipe 21 into a liquid zone in the bottom and a gas zone on the top 39. The separator 17 is a seal and some liquid fuel 14 may leak through to the vapor space 39.

The pump 40 further comprises a piston rod 22 and a piston 23, which is the piston for liquefied fuel such as liquid hydrogen. The piston 23 may have a circular shape in some embodiments. The piston rod 22 goes through the separator 17. The piston rod 22 is connected with an external hydraulic piston 41, which may be connected with a power drive and an actuator (not shown).

The pump 40 further comprises pump cylinder 27 disposed below the separator 17 and inside the inner pipe 21 configured to accommodate the piston 23. The pump cylinder 27 is coupled with the separator 17. A side wall of the pump cylinder 27 defines a hole 4. Inside the pump cylinder 27, the space below and above the piston 23 are labelled as 35 and 38, respectively, which are pump chambers, and are configured to hold liquefied fuel (e.g., $LH_2$) during the operation of the pump 40.

The pump 40 also comprises an isolation valve 5 and an intake port 34. The isolation valve 5 is configured to supply the liquefied fuel 14 from the cryotank 10 to the intake port 34.

Referring to FIG. 1-2, the isolation valve 5 is disposed on the bottom wall 21b of the inner pipe 21. The isolation valve 5 can be commanded (controlled) to be open or closed if needed. The isolation valve 5 may be actuated and control through an external actuator (not shown). One suitable example of the isolation valve 5 is disclosed in U.S. 2020/0240379, issued as U.S. Pat. No. 11,149,703. By closing the isolation valve 5, the pump housing is isolated from the inner vessel 13 with liquefied fuel so that the pump 40 can be removed without impact to the inner vessel 13.

In some embodiments, the piston 23 has a front surface 23a facing an intake port 34. In the extension mode, the piston 23 moves toward the intake port 34. In the retraction mode, the piston moves further away from the intake port 34.

In some embodiments, at least one check valve 6 is disposed on a supporting wall 19, which is disposed between the inner pipe 21a and the pump cylinder 27. In some embodiments, a check valve 24 is disposed at the bottom wall of the pump cylinder 27. The check valves 6, 24 and 26 open and close automatically. The check valves such as valves 6, 24, and 26 as described herein are one-way valve. The space at the bottom of the inner pipe 21 and below the supporting wall 19 is the intake port 34 of the pump 40, is configured to take liquefied fuel 14 (e.g., $LH_2$) from the inner tank 13 during the operation of the pump 40.

A backside pump chamber 38 is located between the separator 17 and the supporting wall 19 and between the inner pipe 21 and the pump cylinder 27. Chamber 38 is fluidly connected with chamber 36 in the same annual space between pump cylinder 27 and inner pipe 21. Such a backside pump chamber is configured to hold liquefied fuel 14 from the hole 4 and from the check valve 6. The liquefied fuel 14 in the backside pump chamber 38 from the hole 4 may absorb dynamic heat from the pump 40. Such a liquefied fuel from the backside of the piston 23 may absorb dynamic heat when the pump 40 works in an extension or retraction mode, and may be warmer than the liquefied fuel in the intake port.

The exemplary system 100 further includes a first pipe 8 fluidly connected to a vapor pump chamber 39 configured to hold vapor of the liquefied fuel in the pump, and a second pipe 7 fluidly connected to a first liquid pump chamber configured to hold the liquefied fuel contacting or in contact with a backside 23b of the piston 23.

As shown in FIGS. 1-2, the pipes 7 and 8 are fluidly connected with the side wall 21a of the inner pipe 21 of the pump 40. The pipe 7 is configured to discharge liquefied fuel 14 from the liquid pump chamber 36, which is a bottom section of the pump 40. The pipe 8 is configured to discharge the any gaseous fuel present in the vapor space 39. Such a gaseous fuel is vapor from the liquefied fuel 14 leaked past the separator seal 17 to the vapor chamber 39 in the upper section of the inner pipe 21 after absorbing heat from the pump 40.

The upper section of the pump 40 refers to the section of the pump 40 above the separator 17. The vapor chamber 39 can be also referred as the upper chamber. The chambers inside the pump 40 below the separator 17 are liquid chambers, or referred as lower chambers, which are configured to hold a liquefied fuel. For the convenience of description, the liquid pump chamber 36 is the first liquid pump chamber. The liquid pump chamber 35 may be the second liquid pump chamber. The backside pump chamber 38 is also a liquid chamber in the pump 40. Chamber 38 and chamber 36 are fluidly connected.

The exemplary system 100 further comprises a discharge line 25 fluidly connected with the pump 40 and configured to dispense the stream of the liquefied fuel out of the pump 40. As shown in FIGS. 1-2, the liquefied fuel 14 can be pumped out to a dispenser through the discharge line 25 (pipe), which has a check valve 26 and is fluidly connected with the pump cylinder 27. The discharge line 25 and the check valve are inside the inner pipe 21. The check valve 26 opens one-way only. For example, as shown in FIG. 2, in some embodiments, the discharge line 25 is fluidly connected with the bottom wall of the pump cylinder 27. When the piston 23 is extended, the liquefied fuel can be pumped out. The stream of the liquefied fuel may be provided to a dispenser, and dispensed into an on-board tank in a fuel-cell vehicle in some embodiments.

Referring to FIGS. 1 and 2, in accordance with some embodiments, the exemplary system 100 comprises a switching valve 30 along with a pipe or line 31, which are configured to flow the liquefied fuel 14 in liquid or vapor phases from the pipes 7 and 8 back to the intake port 34 of the pump 40 if needed. As shown in FIGS. 1 and 2, in some embodiments, the pipe 31 connected with the switching valve 30 is fluidly connected with the inner pipe 21 of the pump 40. The connection point of the pipe 31 is near the intake check valve 24. The switching valve 30 is fluidly connected to the pipe 8 referred as the first pipe and the pipe 7 referred as the second pipe, and is configured to flow the vapor of the liquefied fuel 14 in the pump 40 and the liquefied fuel 14 contacting the backside 23b of the piston 23 to the intake port 34 of the pump 40 through the pipe 31 referred as a third pipe.

In addition, the exemplary system 100 is also configured to flow the liquefied fuel 14 in liquid or vapor phases from the pipes 7 and 8 back to the cryotank 10. The exemplary system 100 further comprises at least one block valve 50 or 51 fluidly connected to the first pipe, the second pipe, and the headspace 18 of the cryotank 10. The at least one block valve 50 or 51 is fluidly connected to the switching valve 30. Each of the switching valve 30 and the at least one block valve 50 or 51 can be opened or closed.

As shown in FIGS. 1-2, the exemplary system 100 includes double-block valves 50 and 51, which are configured to flow the liquefied fuel 14 from the pipes 7 and 8 back to the inner vessel 13 of the cryotank 10, through a pipe 52. The pipe 52 is fluidly connected with the internal pipe 21 of the cryopump, through the pipe 8 in the upper gaseous section and the pipe 7 in the lower liquid section. Flow of liquefied fuel 14 to the cryotank 10 occurs when the switching valve 30 is closed. When the valves 50 and 51 are closed, the liquefied fuel 14 from the pipes 7 and 8 flow back the pump 40. In some embodiments, these two routes may co-exists and the ratio between the two routes may be adjusted.

The exemplary system 100 may further comprise a pressure relief valve 53 between the valves 50 and 51 to vent the vapor in the headspace of the cryotank if needed. Further options for purging and venting are provided with the venting line between the switching valve 30 and the valve 50.

The exemplary system 100 may further comprise one or more controller 60 for controlling the steps of the method and the components as described herein. The controller 60 may be electronically connected with the related components in the system 100, for examples valves 30, 50 and 51, the venting line 59. The controller 60 may comprise one or more processors and at least one tangible, non-transitory machine readable medium encoded with one or more programs to be executed by the one or more processors. The controller 60 is configured to coordinate with each component so as to control the operation, for example, operating the cryopump in different modes, controlling liquefied fuel storage, and refueling the vehicles. The controller 60 is connected with the cryotank 10. For example, the controller 60 may be connected with the inner vessel 13 through connection 64 and is configured to test the headspace pressure inside the inner vessel 13. The controller 60 is used to monitor the headspace condition and switch between the operating modes as described herein. For example, the controller 60 is configured to measure the headspace pressure or temperature inside the cryotank 10 and control the at least one block valve 50 or 51, the switching valve 30, and/or the isolation valve 5 so that the system is operated in different working modes based on the headspace pressure or the temperature. The exemplary system 100 is configured to be operated in one of the three working modes including a pressure increase mode, a pressure maintaining mode, and a pressure decrease mode, to increase, maintain, or decrease a headspace pressure inside the cryotank, respectively.

The components described above may have any suitable sizes. For example, the inner pipe 21 of the pump 40 may have a dimeter in a range of from 25 cm to 50 cm. The outer pipe 20 of the pump 40 may have a dimeter in a range of from 35 cm to 70 cm. The pipes and lines 7, 8, 31, 25 and 52 may have any suitable sizes, for example, having a diameter in a range of 1 cm to 15 cm. In some embodiments, the pipe 52 has an inner diameter of about 2.5 cm.

The pressure increase mode as described above may be used when the headspace pressure (P) is lower than a first pressure threshold (P1). In some embodiments, in the pressure increase mode, the switching valve 30 is closed and the at least one block valve 50 or 51 is open. If the system includes two block valves 50 and 51 as shown in FIGS. 1-2, both block valves are open in the pressure increase mode. The isolation valve 5 may be closed or open.

Figure 3:
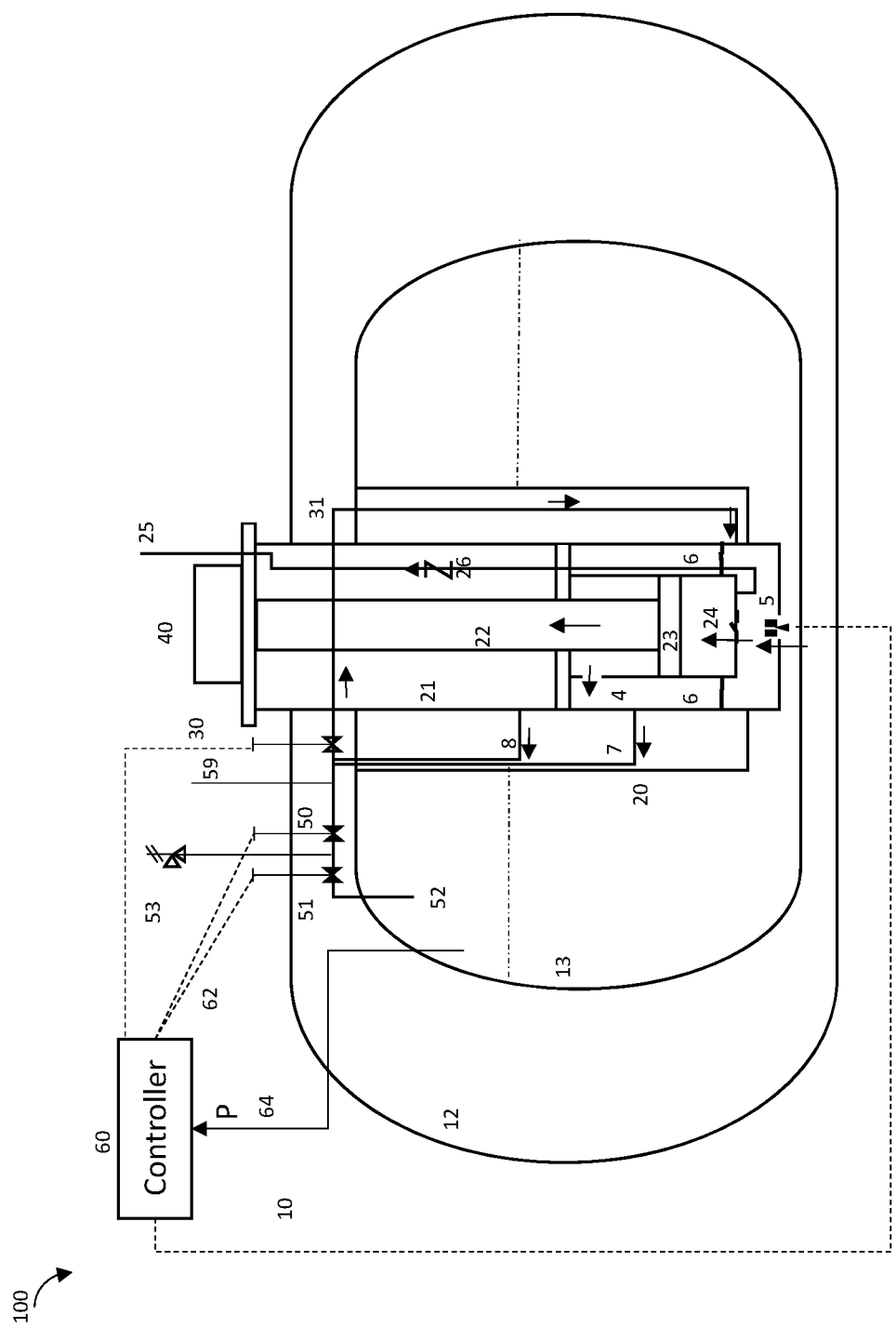
FIG. 3 illustrates the exemplary system of FIG. 1 including flow paths of a liquefied fuel fluid such as liquid and vapor when the cryopump is in a retraction mode, in which the piston retracts, in accordance with some embodiments.

Referring to FIG. 3, the exemplary system 100 in a retraction mode is illustrated. The chambers and spaces are labelled in FIG. 2. The scenarios in which the switching valve 30 is closed or the exemplary system does not have the switching valve 30 are described first.

When the piston 23 of the pump 40, which is a single-stage, single-acting reciprocating cryopump, retracts in a suction stroke, the isolation valve 5 and the check valve 24 open while the check valve 6 closes. Liquified fuel 14 in a liquid state from the cryotank 10 enters into the pump chamber 35. The liquefied fuel 14 from the chamber 38 in the back of the piston 23 exits through opening 4 to the chamber 36, and flows through the pipe 7.

When the switching valve 30 is closed or when the exemplary system does not have the switching valve 30, the liquefied fuel 14 from the chamber 38 and the chamber 36 flow through the valves 50 and 51, and enters into the inner vessel of the cryotank 10 through an opening of the pipe 52.

The gas line 8 is configured to vent the vapor from the vapor space 39 on the upper section of the pump housing to the headspace of the cryotank 10, and provides pressure equalization between the vapor space 39 on the upper section of the pump housing and the liquid spaces (e.g., pump chambers 36 and 38) at the bottom section of the pump housing. As illustrated in FIG. 3, the vapor phase from the vapor space 39 goes through the gas line 8 to the headspace 18, when the switching valve 30 is closed. The vapor from the vapor space 39 and the liquid phase from the backside chamber 38 behind the back of the piston 23 may have a higher temperature than that of liquefied fuel 14 in the cryotank 10 because they absorb the dynamic heat from the pump 40.

Figure 4:
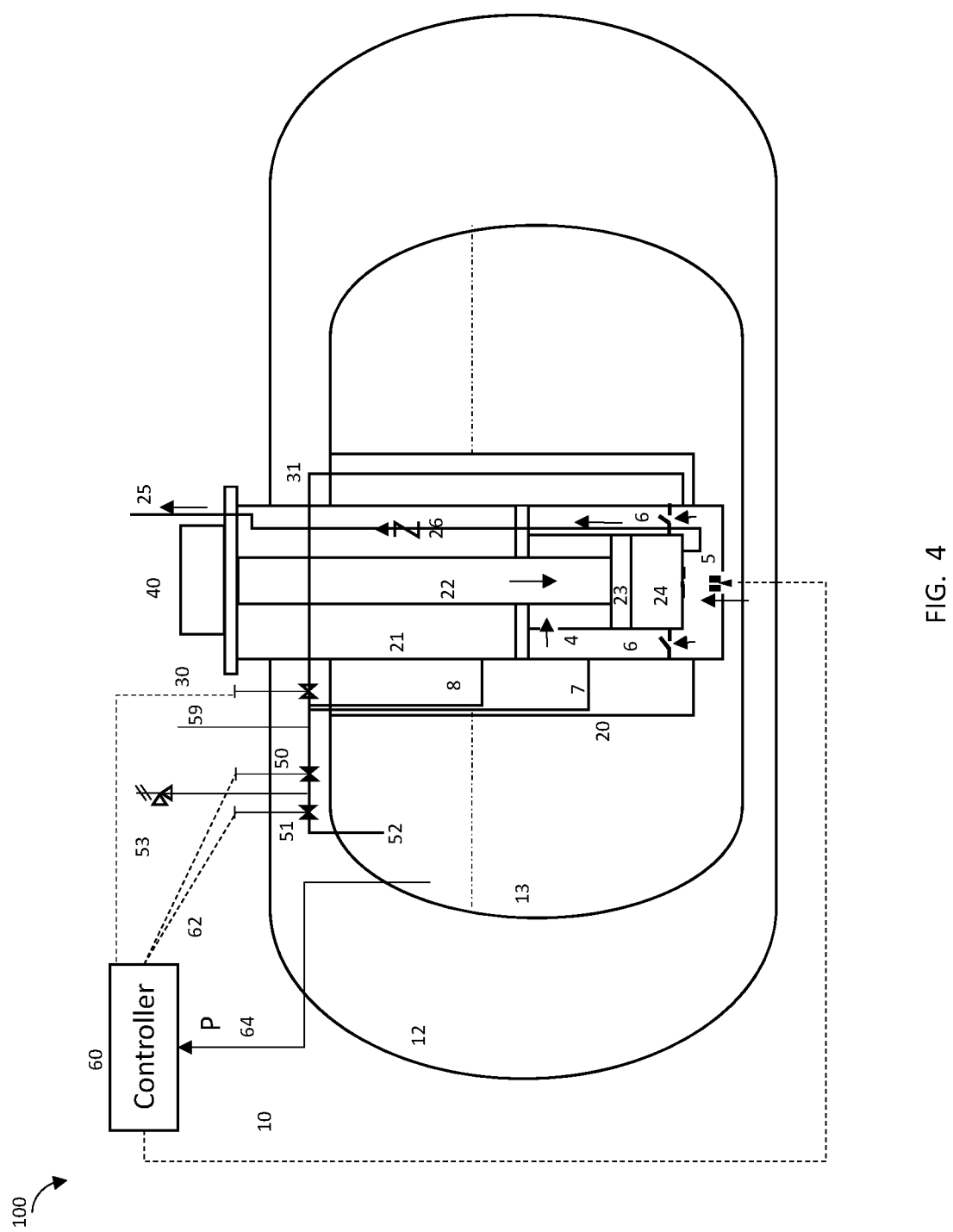
FIG. 4 illustrates the exemplary system of FIG. 1 including flow paths of a liquefied fuel fluid such as liquid and vapor when the cryopump is in an extension mode, in which the piston extends, in accordance with some embodiments.

Referring to FIG. 4, the exemplary system 100 in an extension mode is illustrated. The chambers and spaces are labelled in FIG. 2. The scenarios in which the switching valve 30 is closed or the exemplary system does not have the switching valve 30 are described first.

When the piston 23 extends during compression, the check valve 24 closes, forcing liquefied fuel from the pump chamber to exit through the check valve 26 to the discharge line 25.

In the arrangement without the switching valve 30 or with the switching valve 30 closed, any seal leakage around the piston 23, liquid in the back of the piston 23, along with frictional heating picked up around the pump chamber and the piston, are carried back into the cryotank through the line 52. This mode of operation is a pressure build mode because it adds heat into the cryotank 10 during operation and increases the headspace pressure. The headspace pressure in the vapor phase 16 is approximately the same as the cryotank pressure for the liquid phase 14.

Referring back to FIGS. 3-4, the switching valve 30 along with the line 31 can be configured to redirect the liquefied fuel fluid such as the vapor phase from the pipe 8 and the liquid phase from the pipe 7 with dynamic heat back to the intake port of the pump 40, which can be near the intake check valve 24.

In the pressure maintaining mode, the switching valve 30 is open, while the block valve 50 and/or the block valve 51 are closed. The isolation valve 5 is open during this working mode. As shown in FIG. 3, during suction stroke when the piston 23 retracts, check valve 24 opens, and admits fluid from both the cryotank 10 (i.e., inner vessel 13 of the cryotank 10) via the isolation valve 5. The isolation valve 5 is open while the check valve 6 is closed. The check valve 24 also admits the fluid of liquefied fuel 14 from line 31. The liquefied fuel 14 from the chamber 38 in the back of the piston 23, with heat absorbed, exits through opening 4 to the chamber 36, and flows through the pipe 7. The liquefied fuel fluid such as liquid from the pipe 7 and the vapor from the pipe 8 goes through the switching valve 30, returns to the pump 40, and mixes with the liquefied fuel 14 from the cryotank 10.

As shown in FIG. 4, in the pressure maintaining mode, when the pump 40 is in an extension mode, the piston 23 extends toward the bottom of the pump 40. The isolation valve 5 and the check valve 6 are open while the check valve 24 is closed. The liquefied fuel 14 including the fluid from the line 31 exits from the pump 40 from the check valve 26 and the discharge line 25. Some cold liquefied fuel 14 from the check valve 6 and inside the chamber 36 may be sucked into the chamber 38 in the back of the piston 23 through opening 4.

Energy from the dynamic heat leak contained in the fluid from line 31 enters the pump chamber 35, and subsequently exits the pump 40 through the check valve 26 and discharge line 25. Consequently, no dynamic heat input is introduced into the cryotank 10. Although there is still static heat leak, the removal of liquid from the cryotank 10 increases the headspace volume and lowers its pressure. The enthalpy of the liquid is another source of heat removal from the cryotank 10. The balance between the static heat leak and liquid removal results in a steady cryotank pressure in such a pressure maintaining mode as illustrated in FIGS. 3-4.

Such a pressure maintaining mode may be used when the headspace pressure (P) is equal to or higher than the first pressure threshold (P1) while lower than the second pressure threshold (P2). The exemplary system works in the pressure maintaining mode when the headspace pressure (P) is in a range from P1 to P2.

Figure 5:
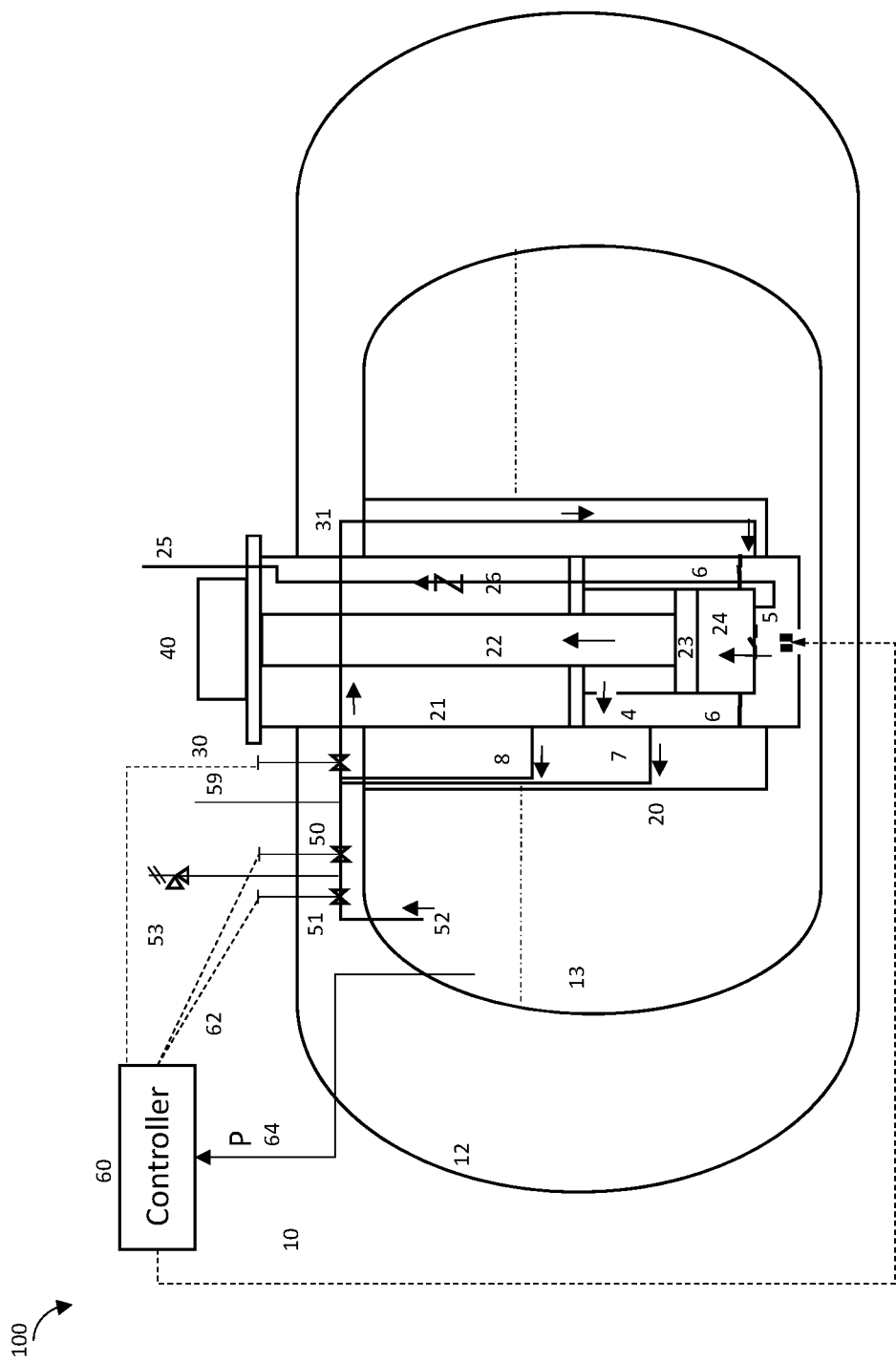
FIG. 5 illustrates the exemplary system of FIG. 1 including flow paths of a liquefied fuel fluid such as liquid and vapor when the cryopump is in a retraction mode and the system is in a pressure reduction mode, in accordance with some embodiments.
Figure 6:
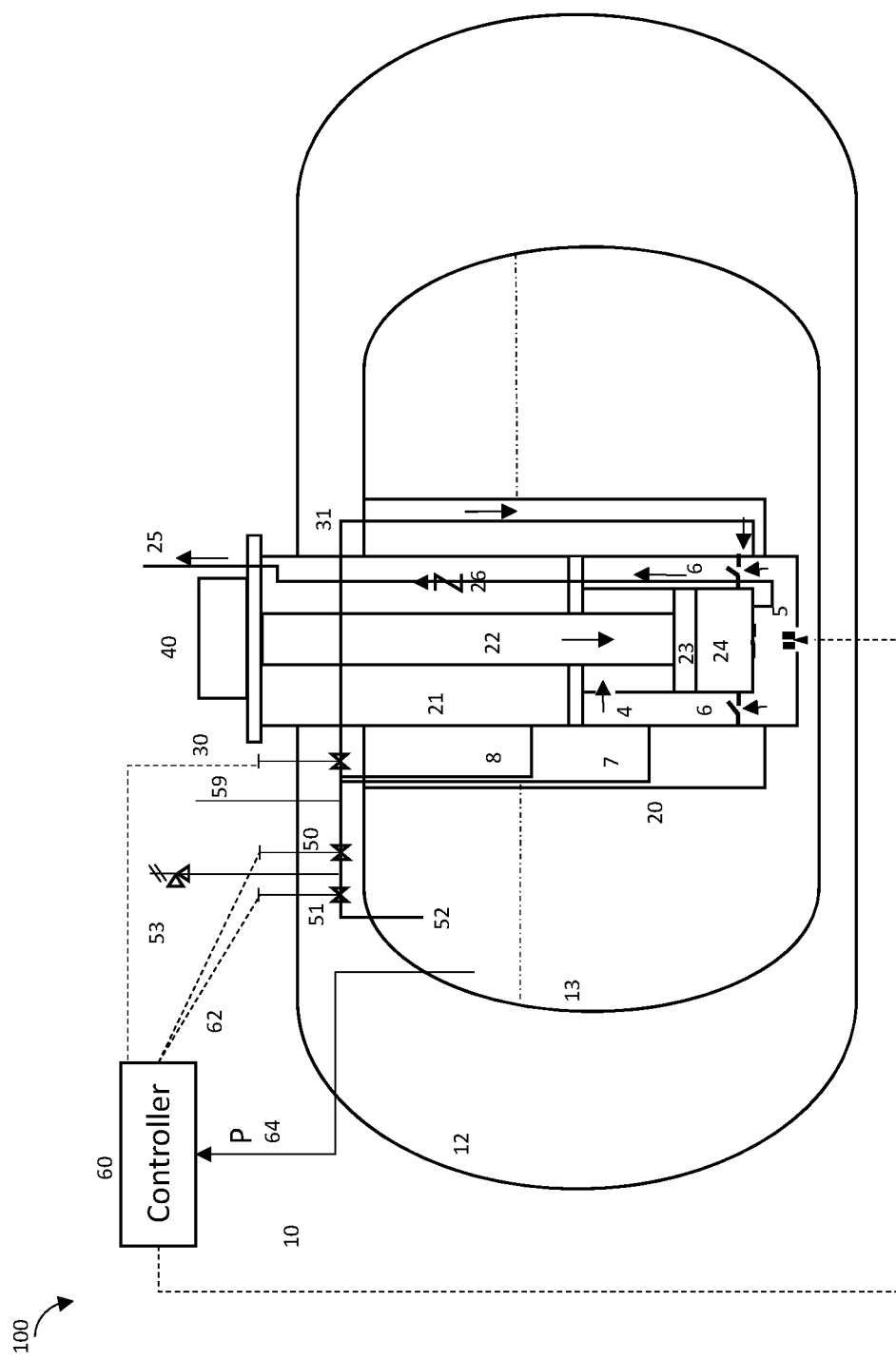
FIG. 6 illustrates the exemplary system of FIG. 1 including flow paths of a liquefied fuel fluid such as liquid and vapor when the cryopump is in an extension mode and the system is in a pressure reduction mode, in which the piston extends, in accordance with some embodiments.
Figure 7:
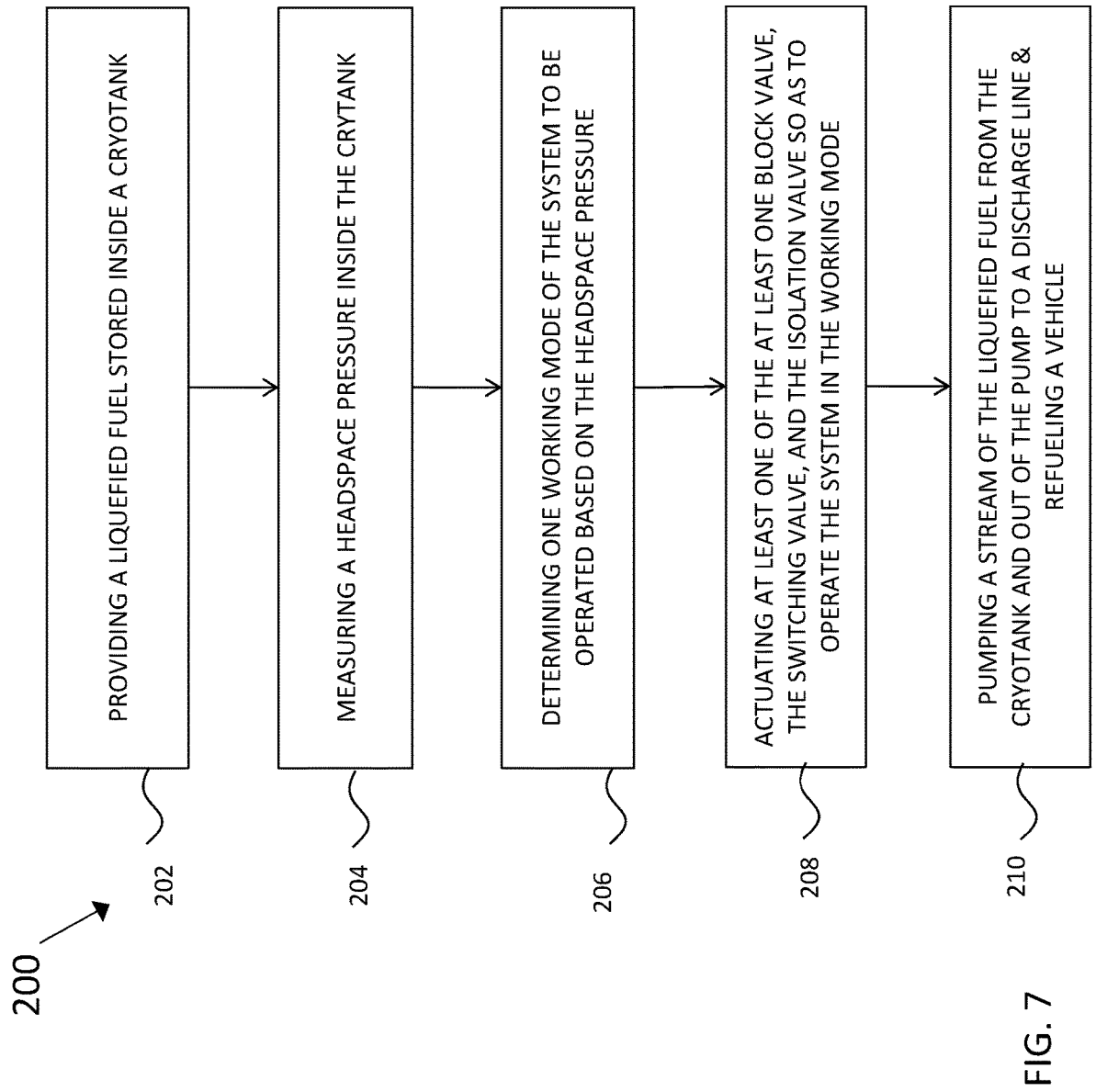
FIG. 7 is a flow chart illustrating an exemplary method in accordance with some embodiments.

Referring to FIGS. 5-6, the exemplary system 100 working in a pressure reduction mode is illustrated. As shown in FIG. 5, the pump 40 is in a retraction mode. As shown in FIG. 6, the pump 40 is in an extension mode, in which the piston extends. In the pressure decrease mode, the switching valve 30 is open, and the block valve or valves 50 and 51 are open. The isolation valve 5 is closed.

When the headspace pressure (P) is above the second pressure threshold (P2), pressure reduction is desired to prevent venting of the boil-off in the headspace 18 of the cryotank 10. As shown in FIG. 5, the isolation valve 5 is closed, while valves 50 and 51 are open. The switching valve 30 is also open with a flow path from the headspace 18 of the cryotank 10 to the pump intake port near the check valve 24 is established. As also shown in FIG. 5, other components such as the check valve 6 (closed), the check valve 24 (open), and the lines 7 and 8 work similarly as those described in FIG. 3. The headspace vapor 16 flows into the pump 40, and may be mixed with the liquefied fuel 14 therein.

As shown in FIG. 6, the pump 40 is in an extension mode while the isolation valve 5 is closed. The valves 50 and 51 are open. The switching valve 30 and the line 31 are open. Other components such as the check valve 6 (open), the check valve 24 (closed), and the lines 7 and 8 work similarly as those described in FIG. 4. The headspace vapor 16 or a mixture of the headspace vapor is pumped out through the check valve 26 and the line 25.

As shown in FIGS. 5-6, in such a pressure reduction mode, the headspace vapor 16 is pumped out of the cryotank 10 to reduce pressure directly.

As one of the significant benefits provided by the exemplary system 100, the pump 40 is capable of pumping both liquid and vapor of the liquefied fuel. The flow rate in this vapor pumping mode is lower than the pump design flow rate of the liquefied fuel in liquid state. For example, the saturated liquid and vapor densities of hydrogen at 0.8 MPa are 52.4 and 12.1 kg/m$^3$, respectively. The hydrogen mass flow rate with vapor pumping is only about 23% of liquid pumping.

To facilitate vapor compression, it is desirable to enable the pressure reduction mode when the discharge pressure is relatively low, such as at the beginning of a vehicle fill. Control logic can be implemented to manage the timing of mode switching and duration.

During back-to-back vehicle fueling, a large amount of liquid is withdrawn from the cryotank 10, and this can cause the tank pressure to decrease, depending on the liquid level, liquid density, the tank volume, and the initial tank pressure. For example, for 240 kg/hr pump flow at a nominal liquid hydrogen density of 70 kg/m$^3$, and with a liquid level of 80% and an initial tank pressure of 0.5 MPa, a pressure decrease rate of 0.011 MPa/hr is expected under continuous operation. At a lower liquid levels, the headspace volume is larger, and the pressure drop rates are smaller.

Referring to FIGS. 1-6, in some embodiments, the switching valve 30 is disposed outside the pump. The pump 40 has a pump housing with a double-wall structure. The first pipe 8, the second pipe 7, and the third pipe 31 are disposed between two walls of the pump housing.

In FIGS. 1-6, one pump 40 is included for illustration only. In some embodiments, the pump 40 might be more than one, for example, two or more such submerged liquid pumps disposed inside the cryotank 10. Each pump 40 may be separate and has a respective intake port. Or the two or more submerged liquid pumps 40 share a same intake port 34. The multiple pumps 40 may be connected in parallel and then coupled together with the first pipe 8, the second pipe 7, and the third pipe 31, respectively.

In one aspect, as described above, the present disclosure provides an exemplary system 100 for refueling hydrogen such as a hydrogen refueling station. The system 100 comprises a cryotank 10 configured to store a liquefied fuel 14 therein, which is hydrogen, and at least one pump 40 configured to be disposed inside the cryotank 10. The pump 40 is configured to provide a stream of the liquefied fuel 14 from the cryotank 10. The pump 40 has a piston 23, an intake port 34, and an isolation valve 5 configured to supply the liquefied fuel 14 from the cryotank 10 to the intake port 34. The piston 23 has a front side 23a facing the intake port 34 and a backside 23b opposite to the front side.

The system 100 further comprises a first pipe 8 fluidly connected to a vapor pump chamber 39 configured to hold vapor of the liquefied fuel in the pump 40, and a second pipe 7 fluidly connected to a first liquid pump chamber 36 configured to hold the liquefied fuel contacting a backside 23b of the piston 23.

The system 100 further comprises a switching valve 30 fluidly connected to the first pipe 8 and the second pipe 7. The switching valve 30 is configured to flow the vapor of the liquefied fuel in the pump 40 and the liquefied fuel contacting the backside of the piston 23 to the intake port of the pump 40 through a third pipe 31. The system 100 further comprises at least one block valve 50 or 51 fluidly connected to the first pipe 8, the second pipe 7, the cryotank 10, and the switching valve 30.

The system 100 may also comprise a controller 60 connected with the cryotank 10, the at least one block valve 50 or 51, and the switching valve 30. The controller 60 is configured to actuate the at least one block valve 50 or 51, the switching valve 30, and/or the isolation valve 5 so as to operate the system 100 in one of three working modes based on the headspace pressure or temperature in the cryotank 10. The three working modes include a pressure increase mode, a pressure maintaining mode, and a pressure decrease mode.

The controller 60 may comprise one or more processors and at least one tangible, non-transitory machine readable medium encoded with one or more programs to be executed by the one or more processors to control the components of the system. For example, the controller 60 may be configured to measure the headspace pressure or temperature and actuate the at least one block valve 50 or 51, the switching valve 30, and/or the isolation valve 5.

The exemplary system 100 may further comprise a dispenser in a refueling station. The exemplary system 100 may be integrated for refueling hydrogen to fuel cell vehicles. The dispenser is configured to receive the stream of the liquefied fuel 14 from the line 25 and dispense it in a form of a gaseous fuel to a receiving fuel tank such as an onboard fuel tank for a vehicle. The refueling station may also include a heat exchanger for converting liquefied fuel 14 to a gaseous fuel to be dispensed. The gaseous fuel may be at an increased pressure before dispensed. In some embodiments, the pump may compress the liquefied fuel to increase its pressure during the pumping operation.

Referring to FIG. 7, the present disclosure provides an exemplary method 200 of using the system 100 as described above and also described below generally.

At step 202, a liquefied fuel 14 is provided and stored inside a cryotank 10. In some embodiments, the liquefied fuel 14 comprises or is hydrogen.

At step 204, a headspace pressure and/or temperature inside the cryotank 10 is measured. The fill level of the liquid in the cryotank 10 may also be measured.

At step 206, one working mode of the system to be operated is determined based on the headspace pressure and/or the temperature. The working mode is one of three working modes including a pressure increase mode, a pressure maintaining mode, and a pressure decrease mode.

At step 208, at least one of the at least one block valve, the switching valve, and the isolation valve is actuated so as to operate the system in the working mode.

In some embodiments, when the headspace pressure is lower than a first threshold pressure (P1), the pressure increase mode is determined and activated. When the headspace pressure is in a range from the first threshold pressure (P1) to a second threshold pressure (P2), wherein P2>P1, the pressure maintaining mode is determined and activated. When the headspace pressure is higher than the second threshold pressure (P2), the pressure decrease mode is determined and activated.

In some embodiments, the first threshold pressure (P1) may be about 0.1 MPa. The second threshold pressure (P2) may be a pressure in a range from 0.2 MPa to 0.5 MPa. For example, P1 is about 0.1 MPa and P2 is about 0.5 MPa. When the headspace pressure (P) is in a range from about 0.1 MPa to about 0.5 MPa, the system works in the pressure maintaining mode in some embodiments. When the headspace pressure is higher than 0.5 MPa, the system words in a pressure reducing mode.

The working modes may also be determined based on the temperature in the cryotank 10 in some embodiments. For example, when the headspace temperature is lower than a first threshold temperature (T1), the pressure increase mode is determined and activated. When the headspace temperature is in a range from the first threshold temperature (T1) to a second threshold temperature (T2), wherein T2>T1, the pressure maintaining mode is determined and activated. When the headspace temperature is higher than the second threshold temperature (T2), the pressure decrease mode is determined and activated. No dynamic heat input is introduced into the cryotank, and the cryotank pressure reduces as pump operates.

If the fill level of the liquefied fuel in the tank is too low or too high, the controller 60 of the system 100 may provide the warning. Compared to the situation when the fill level is in a normal range, the working mode may be different when the cryotank is close to full or empty.

In some embodiments, in the pressure increase mode, the switching valve 30 is closed and the block valves 50 and 51 are open. The isolation valve 5 is open. In the pressure maintaining mode, the switching valve 30 is open, at least one block valve 50 or 51 is closed, and the isolation valve 5 is open. In the pressure decrease mode, the switching valve 30 is open, the block valves 50 and 51 are open, and the isolation valve 5 is closed.

At step 210, a stream of the liquefied fuel from the cryotank 10 is pumped out of the pump 40 to a discharge line 25. In some embodiments, the liquefied fuel comprises hydrogen, and the method is for refueling hydrogen to a fuel-cell vehicle. The stream of the liquefied fuel is pumped to a dispenser, and is dispensed into an on-board tank of a fuel-cell vehicle. At step 210, a dispensing cycle is operated to refuel a vehicle. The hydrogen fuel can be dispensed to a vehicle at a suitable pressure, for example, 35 MPa or 70 MPa. The compressed hydrogen gas may be at a temperature of −40° C. and be dispensed at a temperature such as −20° C. a dispensing cycle to refuel a vehicle.

Steps 204, 206, 208, and 210 may be repeated for additional refueling or filings needed. In some embodiments, one working mode is determined for refueling hydrogen to more than two fuel-cell vehicles.

During the idle time between two refueling events, the pressure or the temperature inside the cryotank is also monitored, and a working mode is also determined and activated if needed. For example, after a long idle time, the headspace pressure may increase due to the static heat leak. A pressure decrease mode may be activated to decrease the pressure.

As described above, a plurality of pumps may be disposed inside the cryotank and may be operated at the same time. One pump may have its own intake port, or multiple pumps share one intake port.

The boil-off loss in the system 100 is minimized. If venting a boil-off is needed, a device for recovering the boil-off may be used in some embodiments. The system may comprises a recovery sub-system. For example, the boil-off gas may be cooled down to a liquid state and such a recovered liquefied fuel is fed back to the cryotank. Alternatively, the vented boil-off gas such as hydrogen can be compressed through compressor in the recovery sub-system to have an increased pressure above 35 MPa. The compressed gas is delivered to a cascade tube storage for subsequent delivery to a vehicle during a refueling process.

The system and the method provided in the present disclosure provide many advantages as described herein. For example, in some embodiments, the present disclosure provides a system for hydrogen storage and refueling. The benefits include the ability to work in multiple-mode based on the headspace pressure, manage headspace pressure, and minimize loss of the liquefied fuel. The system minimizes or eliminates losses of liquefied fuel such as hydrogen or has minimal losses of hydrogen boil-off.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods. The computer or the control unit may be operated remotely using a cloud based system.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
   a cryotank configured to store a liquefied fuel therein;
   a pump configured to be disposed inside the cryotank and provide a stream of the liquefied fuel from the cryotank, the pump having a piston, an intake port, and an isolation valve configured to supply the liquefied fuel to the intake port;
   a first pipe fluidly connected to a vapor pump chamber configured to hold vapor of the liquefied fuel in the pump;
   a second pipe fluidly connected to a first liquid pump chamber configured to hold the liquefied fuel contacting a backside of the piston; and
   a switching valve fluidly connected to the first pipe and the second pipe, and configured to flow the vapor of the liquefied fuel in the pump and the liquefied fuel contacting the backside of the piston to the intake port of the pump through a third pipe.

2. The system of claim 1, further comprising:
   at least one block valve fluidly connected to the first pipe, the second pipe, and a headspace of the cryotank.

3. The system of claim 2, wherein the at least one block valve is fluidly connected to the switching valve.

4. The system of claim 2, wherein the system is configured to be operated in one of three working modes including a pressure increase mode, a pressure maintaining mode, and a pressure decrease mode, to increase, maintain, or decrease a headspace pressure inside the cryotank, respectively.

5. The system of claim 4, further comprising a controller connected with the cryotank, the at least one block valve, and the switching valve, and configured to measure the headspace pressure inside the cryotank and control the at least one block valve, the switching valve, and/or the isolation valve so that the system is operated in one of the three working modes based on the headspace pressure.

6. The system of claim 4, wherein in the pressure increase mode, the switching valve is closed and the at least one block valve is open.

7. The system of claim 4, wherein in the pressure maintaining mode, the switching valve is open, the at least one block valve is closed, and the isolation valve is open.

8. The system of claim 4, wherein in the pressure decrease mode, the switching valve is open, the at least one block valve is open, and the isolation valve is closed.

9. The system of claim 1, wherein the liquefied fuel is liquid hydrogen, and the system is a hydrogen refueling system.

10. The system of claim 1, further comprising a discharge line fluidly connected with the pump and configured to dispense the stream of the liquefied fuel out of the pump.

11. The system of claim 1, wherein the switching valve is disposed outside the pump, the pump has a pump housing with a double-wall structure, and the first pipe, the second pipe, and the third pipe are disposed between two walls of the pump housing.

12. The system of claim 1, wherein the pump comprises two or more submerged liquid pumps disposed inside the cryotank.

13. The system of claim 12, wherein each pump has a respective intake port or the two or more submerged liquid pumps share a single intake port; and the two or more submerged liquid pumps are connected in parallel to the first pipe, the second pipe, and the third pipe, respectively.

14. A system for refueling hydrogen, comprising:
a cryotank configured to store a liquefied fuel therein, wherein the liquefied fuel is hydrogen;
a pump configured to be disposed inside the cryotank and provide a stream of the liquefied fuel from the cryotank, the pump having a piston, an intake port, and an isolation valve configured to supply the liquefied fuel to the intake port, wherein the piston has a front side facing the intake port and a backside opposite to the front side;
a first pipe fluidly connected to a vapor pump chamber configured to hold vapor of the liquefied fuel in the pump;
a second pipe fluidly connected to a first liquid pump chamber configured to hold the liquefied fuel contacting a backside of the piston;
a switching valve fluidly connected to the first pipe and the second pipe, and configured to flow the vapor of the liquefied fuel in the pump and the liquefied fuel contacting the backside of the piston to the intake port of the pump through a third pipe;
at least one block valve fluidly connected to the first pipe, the second pipe, the cryotank, and the switching valve; and
a controller connected with the cryotank, the at least one block valve, and the switching valve, and configured to actuate the at least one block valve, the switching valve, and/or the isolation valve so as to operate the system in one of three working modes including a pressure increase mode, a pressure maintaining mode, and a pressure decrease mode, based on the headspace pressure in the cryotank.

15. The system of claim 14, wherein the controller comprises one or more processors and at least one tangible, non-transitory machine readable medium encoded with one or more programs to be executed by the one or more processors to measure the headspace pressure and actuate the at least one block valve, the switching valve, and/or the isolation valve.

16. A method of using the system of claim 1, comprising:
providing a liquefied fuel stored inside a cryotank;
measuring a headspace pressure inside the cryotank;
determining one working mode of the system to be operated based on the headspace pressure, wherein the working mode is one of three working modes including a pressure increase mode, a pressure maintaining mode, and a pressure decrease mode;
actuating at least one of the at least one block valve, the switching valve, and the isolation valve so as to operate the system in the working mode; and
pumping a stream of the liquefied fuel from the cryotank and out of the pump to a discharge line.

17. The method of claim 16, wherein steps of determining one working mode and actuating at least one of the at least one block valve, the switching valve, and the isolation valve are implemented by a controller connected with the cryotank, the at least one block valve, and the switching valve.

18. The method of claim 16, wherein
the pressure increase mode is determined and activated, when the headspace pressure is lower than a first threshold pressure (P1);
the pressure maintaining mode is determined and activated, when the headspace pressure is in a range from the first threshold pressure (P1) to a second threshold pressure (P2), wherein P2>P1; or
the pressure decrease mode is determined and activated, when the headspace pressure is higher than the second threshold pressure (P2).

19. The method of claim 16, wherein in the pressure increase mode, the switching valve is closed and the at least one block valve is open.

20. The method of claim 16, wherein in the pressure maintaining mode, the switching valve is open, the at least one block valve is closed, and the isolation valve is open.

21. The method of claim 16, wherein in the pressure decrease mode, the switching valve is open, the at least one block valve is open, and the isolation valve is closed.

22. The method of claim 16, wherein the liquefied fuel comprises hydrogen, and the method is for refueling hydrogen to a fuel-cell vehicle.

* * * * *